US005526983A

United States Patent [19]
Petit

[11] Patent Number: 5,526,983
[45] Date of Patent: Jun. 18, 1996

[54] WASH OSCILLATOR FOR LATERAL VEHICLE SURFACES

[76] Inventor: Thomas J. Petit, 775 West St., Wadsworth, Ohio 44281

[21] Appl. No.: 340,737

[22] Filed: Nov. 16, 1994

[51] Int. Cl.$^6$ ................................................ B05B 3/14
[52] U.S. Cl. ............................ 239/264; 134/123; 134/181; 74/470; 74/582; 74/42
[58] Field of Search ........................ 239/263.1, 263.3, 239/264; 134/123, 181; 74/470, 582, 42

[56] References Cited

U.S. PATENT DOCUMENTS

| | | | |
|---|---|---|---|
| 4,716,916 | 1/1988 | Hodge | 134/123 |
| 4,794,938 | 1/1989 | Petit | 134/57 R |
| 4,850,379 | 7/1989 | Petit | 134/18 |
| 4,856,543 | 8/1989 | Petit | 134/57 R |
| 4,857,113 | 8/1989 | Hodge | 134/123 |
| 5,148,570 | 9/1992 | Crotts et al. | 134/123 X |
| 5,255,695 | 10/1993 | Downey | 134/181 X |
| 5,280,855 | 1/1994 | Rietsch, Jr. | 239/264 |

FOREIGN PATENT DOCUMENTS

| | | | |
|---|---|---|---|
| 437672 | 11/1926 | Germany | 134/123 |

*Primary Examiner*—Andres Kashnikow
*Assistant Examiner*—Lesley D. Morris
*Attorney, Agent, or Firm*—Oldham & Oldham, Co.

[57] ABSTRACT

A wash oscillator for use in providing high impact wash and rinse action on a lateral surface of a vehicle in an automatic wash facility. The wash oscillator comprises a support structure positioned on a support surface of the wash facility and a motor, having a rotatable output shaft, fixedly attached to the support structure. The oscillator further comprises a spray bar having a plurality of spray nozzles for providing perpendicular impact of washing and rinsing agents onto a lateral surface of the vehicle. The spray bar is pivotally mounted to the support structure via attachment to a pivot block which pivots about an axis of a hinge pin which is rotatably supported by pillow blocks mounted on a support structure. A linkage mechanism connects the output shaft of the motor with the pivot block so as to convert rotary motion of the shaft into an oscillating pivoting motion of the spray bar about the hinge pin axis. The linkage mechanism includes a spring linkage arm having a spring element which is always loaded in compression and which damps the oscillating pivoting motion of the spray bar so as to reduce shock loads imparted at the upstroke and downstroke positions of the spray bar, thereby enhancing the fatigue life of the bearings included in the pivotal mounting mechanism.

20 Claims, 5 Drawing Sheets

WASH OSCILLATOR FOR LATERAL VEHICLE SURFACES

BACKGROUND OF THE INVENTION

1. Field of Invention

The present invention relates to a wash oscillator for a touchless car wash. More particularly, the invention relates to a wash oscillator that provides high impact wash or rinse action at essentially a right angle to the lateral surface of a vehicle being washed, particularly in a touchless car wash.

2. Related Art

The concept of touchless vehicle washing involves cleaning a surface without mechanical agitation such as can be provided by brushes or cloth. Detergents are applied to the surface to dissolve and loosen dirt and soil and pressurized water is used to remove both the detergent and the soil. Because of the electrical forces holding the partially dissolved and/or emulsified dirt on the vehicle surface, the pressurized water must impart a certain minimum impact to the surface to successfully remove the dirt.

Prior teachings regarding the touchless washing of vehicles are contained in U.S. Pat. Nos. 4,850,379 and 4,856,543, both of which are owned by the present inventor. A particular problem encountered in touchless vehicle washing is properly washing the lateral surfaces of the vehicle as it passes the wash station. The solution taught in the cited patents is a stationary vertical spray bar having a plurality of spray nozzles. Impact of the water from such a spray is directly related to several factors, including flow rate, pressure, distance from the surface and the angle of the impingement on the surface. While the vertical spray bar can provide a fixed impingement distance and angle, the vertical spray bar clearly requires a large number of such nozzles. For example, the spray bar necessary to cover the lateral surface of a van would typically require about ten nozzles, each having a 25 degree fan angle. Since the distance and pressure can be fixed, if a flow rate of 5 gpm were needed to obtain sufficient impact, such a device would typically require 50 gpm of water to effectively function. In the oscillator device taught in the present invention, the same result may be achieved with about two nozzles operating at the same flow rate, with a concomitant savings of 40 gpm of water. Alternatively, the flow rate through each nozzle may be increased, effectively increasing the impact. In an alternative known design, the same flow rate savings can be achieved by a horizontal spray bar that oscillates about the axis of the spray bar, but such a spray bar has a constantly changing angular impact with the surface as the bar oscillates, resulting in either unacceptably low impact at the extremes of the range or an overly high impact at the midrange. This changing angular impact is also undesirable. For example, if the angle of impact decreases from about 90 degrees to about 45 degrees, the impact force decreases by about 40%. Another known nozzle arrangement includes a pair of nozzles separated at the respective ends of a spray bar spinning about its midpoint. While this technique does possess certain advantages over the other techniques described above, the longitudinal separation of the nozzles requires that the spray begin to function as soon as the vehicle gets within the range of the nozzles at one-half of the bar length to the left of the midpoint and to continue until the vehicle gets one-half of the bar length to the right of the vehicle. During these extremes, at least one of the nozzles is spraying into the air and not impacting the surface.

SUMMARY OF THE INVENTION

Accordingly, the present invention is directed to a wash oscillator for use in providing high impact wash and rinse action on a lateral surface of a vehicle in an automatic wash facility. In a preferred embodiment, the wash oscillator comprises a support structure positioned on a support surface of the wash facility and a motor, having a rotatable output member, attached to the support structure. The wash oscillator further comprises a spray bar which includes a plurality of spray nozzles for providing perpendicular impact of washing and rinsing agents onto the lateral surface and a means for pivotally mounting the spray bar to the support structure. The wash oscillator further comprises linkage means connected to the rotatable output member and the mounting means for converting a rotary motion of the rotatable output member into an oscillating pivoting motion Of the spray bar about a substantially horizontally extending axis included in the mount means. The spray bar pivots through a predetermined arc between an upstroke position of the oscillating pivoting motion and a downstroke position of the spray bar, with the predetermined arc lying in a substantially vertical plane.

In other preferred embodiments of the present invention, the wash oscillator may comprise the following additional structural features and functions. The linkage means includes a spring linkage arm coupled to the rotatable output member and connected to the mounting means, wherein the spring linkage arm damps the oscillating pivoting motion of the spray bar, thereby reducing shock loads imparted to the mounting means at the upstroke and downstroke positions relative to an otherwise similar wash oscillator using a rigid link in place of the spring linkage arm.

The spring linkage arm comprises a longitudinal axis, a housing disposed coaxially about the axis and an end cap surrounding and attached to a first end of the housing coaxially about the axis. The spring linkage arm further comprises a rod slidingly mounted within the housing and the end cap so as to permit translation of the rod along the axis and a spring element disposed within the housing in surrounding relationship with the rod. Means are provided for coupling the housing to one of the rotatable output member and the mounting means and for coupling the rod to the other of the rotatable output member and the mounting means. The spring element is placed in compression when either tensile or compressive forces act on the rod coupling means causing the rod to translate in first and second directions, respectively, along the spring linkage arm axis.

The spring linkage arm further comprises a first bushing disposed within the housing in abutting relationship with a shoulder formed in the housing and a second bushing disposed in the housing in abutting relationship with the end cap. A third bushing is disposed in the end cap and the rod slidingly engages the first, second and third bushings, which are longitudinally spaced from one another. The spring element extends longitudinally between the first and second bushings. An annular flange is fixedly attached to a first end of the rod and an annular stop is releasably attached to the rod and longitudinally spaced from the flange. The flange is disposed longitudinally between the housing coupling means and the first bushing, with the stop being disposed longitudinally between the second and third bushings. Accordingly, translation of the rod one direction forces the flange against the first bearing and causes a translation of the first bearing in the same direction away from the shoulder so as to compress the spring element between the first and second bearings, wherein translation of the rod in the opposite direction forces the stop against the second bearing and causes a translation of the second bearing in the opposite direction away from the end cap so as to compress the spring element between the first and second bearings.

The rod coupling means comprises a female rod end which is threaded to an end of the rod and the housing coupling means comprises a male rod end which is threaded to the housing. A crank arm is connected to the rotatable output member and one of the male and female rod ends. The means for pivotally mounting the spray bar comprises a pivot block which is pivotally mounted to the support structure, with the spray bar being attached to the pivot block. The pivot block is connected to the other of the male and female rod ends, which is not connected to the crank arm. The means for pivotally mounting the spray bar further comprises first and second pillow blocks which are fixedly attached to the support structure and are substantially horizontally aligned with one another and laterally spaced apart on the support structure. The mounting means further includes a hinge pin having opposite ends rotatably supported by the first and second pillow blocks and a central portion pivotally supporting the pivot block to which the spray bar is attached. The opposite ends of the hinge pin are disposed within the first and second pillow blocks so as to permit the spray bar to pivot about a longitudinal axis of the hinge pin. The spray nozzles are disposed on the spray bar transverse to longitudinal axis of the spray bar so as to impinge the washing and rinsing agents onto the lateral surface of the vehicle at substantially right angles relative to the lateral surface. Preferably, the spray nozzles are fan-type nozzles. The motor may comprise a hydraulic motor and the support structure may comprise a pair of substantially vertically extending and laterally spaced stanchions and at least one cross member interconnecting the pair of stanchions.

The wash oscillator may further comprise a counterweight attached to an end of the spray bar which is proximate the means for pivotally mounting the spray bar, wherein the counterweight minimizes the torque required to pivot the spray bar in the vertical plane.

BRIEF DESCRIPTION OF THE DRAWINGS

The structural features and functions of the present invention will become more apparent from the following detailed description of the preferred embodiments when taken in conjunction with the accompanying drawings, wherein.

DETAILED DESCRIPTION OF THE DRAWINGS

Figure 1:
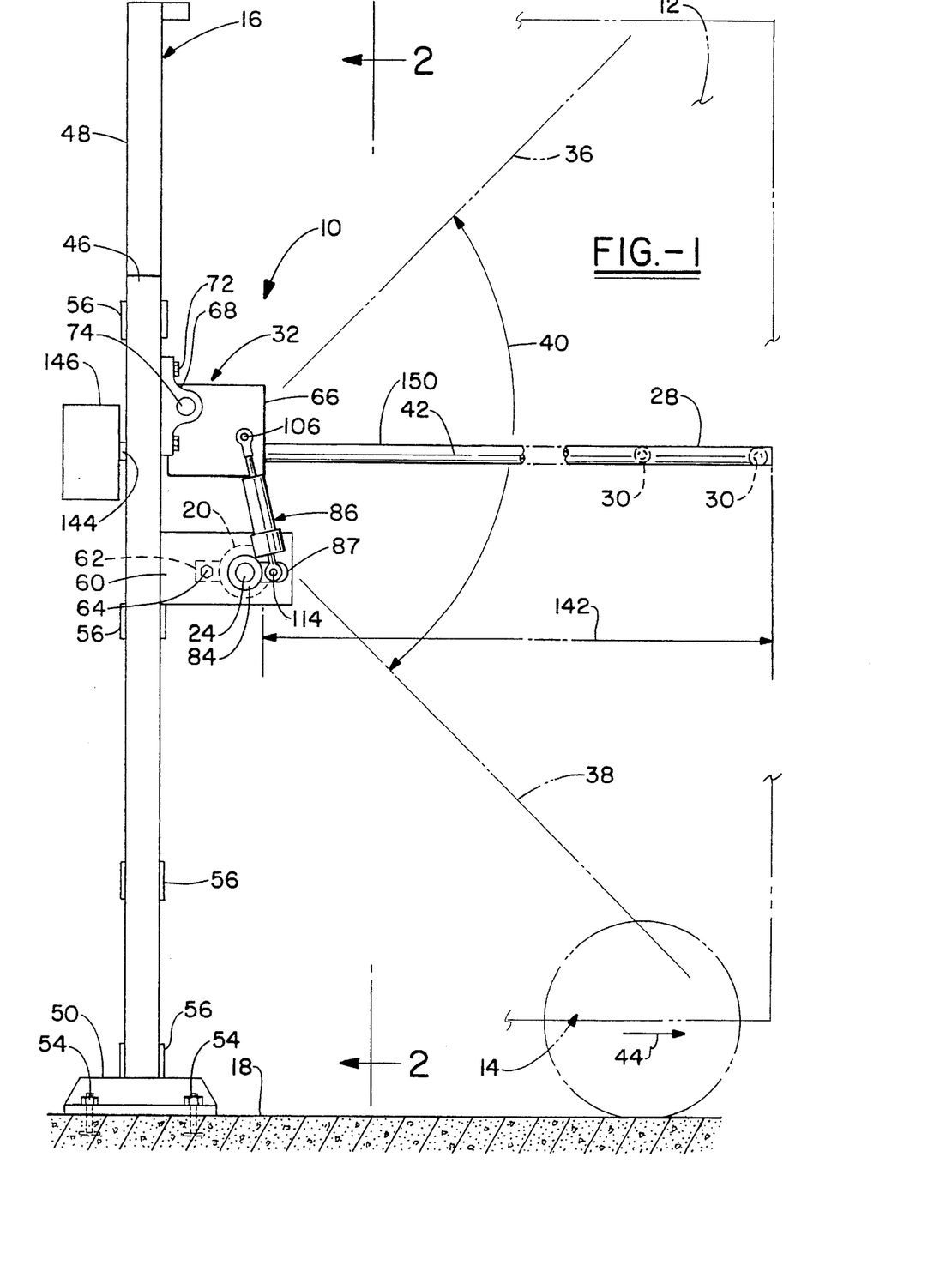
FIG. 1 is an elevational view illustrating the wash oscillator of the present invention.

Referring now to the drawings, wherein like reference numerals have been used for common elements throughout, FIG. 1 is an elevational view illustrating a wash oscillator 10 according to a preferred embodiment of the present invention. Oscillator 10 is used for providing high impact wash and rinse action on a lateral surface 12 of a vehicle 14, partly shown in phantom in FIG. 1, in an automatic wash facility. Oscillator 10 comprises a support structure indicated generally at 16 in FIGS. 1 and 2, which is positioned on a support surface 18, which is typically concrete, of the wash facility. A motor, indicated generally at 20, is fixedly attached to the support structure 16, as subsequently discussed in greater detail. In a preferred embodiment, motor 20 comprises a hydraulic motor and is driven by hydraulic fluid supplied from the wash facility via conventional means, such as flexible hose 22. Motor 20 includes a rotatable output member comprising a shaft 24. Wash oscillator 10 further includes a spray bar 28 which includes a plurality of spray nozzles 30 for providing perpendicular impact of washing and rinsing agents onto the lateral surface 12 of vehicle 14. Means are provided for pivotally mounting spray bar 28 to support structure 16 and are indicated generally at 32 in FIGS. 1 and 2. Linkage means, indicated generally at 34, are connected to rotatable output shaft 24 and mounting means 32 for converting a rotary motion of shaft 24 into an oscillating pivoting motion of spray bar 28 between upstroke and downstroke positions, depicted generally at 36 and 38, respectively, of spray bar 28. During rotation of shaft 24, spray bar 28 pivots through a predetermined arm 40 between upstroke position 36 and downstroke position 38, with arc 40 lying in a substantially vertical plane. During one half of any given revolution of shaft 24, linkage means 34 causes spray bar 28 to travel between downstroke position 38 and upstroke position 36, with spray bar 28 pivoting from upstroke position 36 to downstroke position 38 during the remaining portion of any revolution of shaft 24.

Wash oscillator 10 is used in a touchless automatic vehicle wash facility wherein the vehicle surfaces are cleaned without mechanical agitation such as can be provided by brushes or cloth and is designed to avoid the problems with known spray nozzle systems in such facilities as discussed in the Background of the Invention. In order to maximize the impact of the washing or rinsing agents, nozzles 30 are disposed on spray bar 28 transverse to a longitudinal axis 42 of spray bar 28 so as to impinge washing and rinsing agents sprayed from nozzles 30 onto the lateral surface 12 at substantially right angles relative to surface 12. In the preferred, exemplary embodiment illustrated in FIGS. 1 and 2, spray bar 28 includes a pair of spray nozzles 30, which the inventor has found are sufficient to adequately clean and rinse lateral surface 12 of vehicle 14, which may comprise a relatively large vehicle such as a van or may comprise an automobile, as vehicle 14 passes through the wash facility in a direction of motion indicated by arrow 44. However, additional nozzles 30 may be used within the scope of the present invention. In a preferred embodiment, spray nozzles 30 are fan-type spray nozzles, having a fan angle of approximately 25 degrees and are drilled into the side of spray bar 28. However, other types of spray nozzles may be used, provided that a substantially 90 degree impingement angle is maintained. The pivoting action of the spray bar 28 allows a reduced number of spray nozzles to be utilized to clean and rinse lateral surface 12 as compared to a relatively larger number of nozzles used in a fixed array. Accordingly, wash oscillator 10 of the present invention results in a significant reduction in flow rate of cleaning and rinsing agents relative to a touchless wash facility utilizing a fixed array of nozzles to clean a lateral surface of a vehicle moving past the nozzle array.

Figure 2:
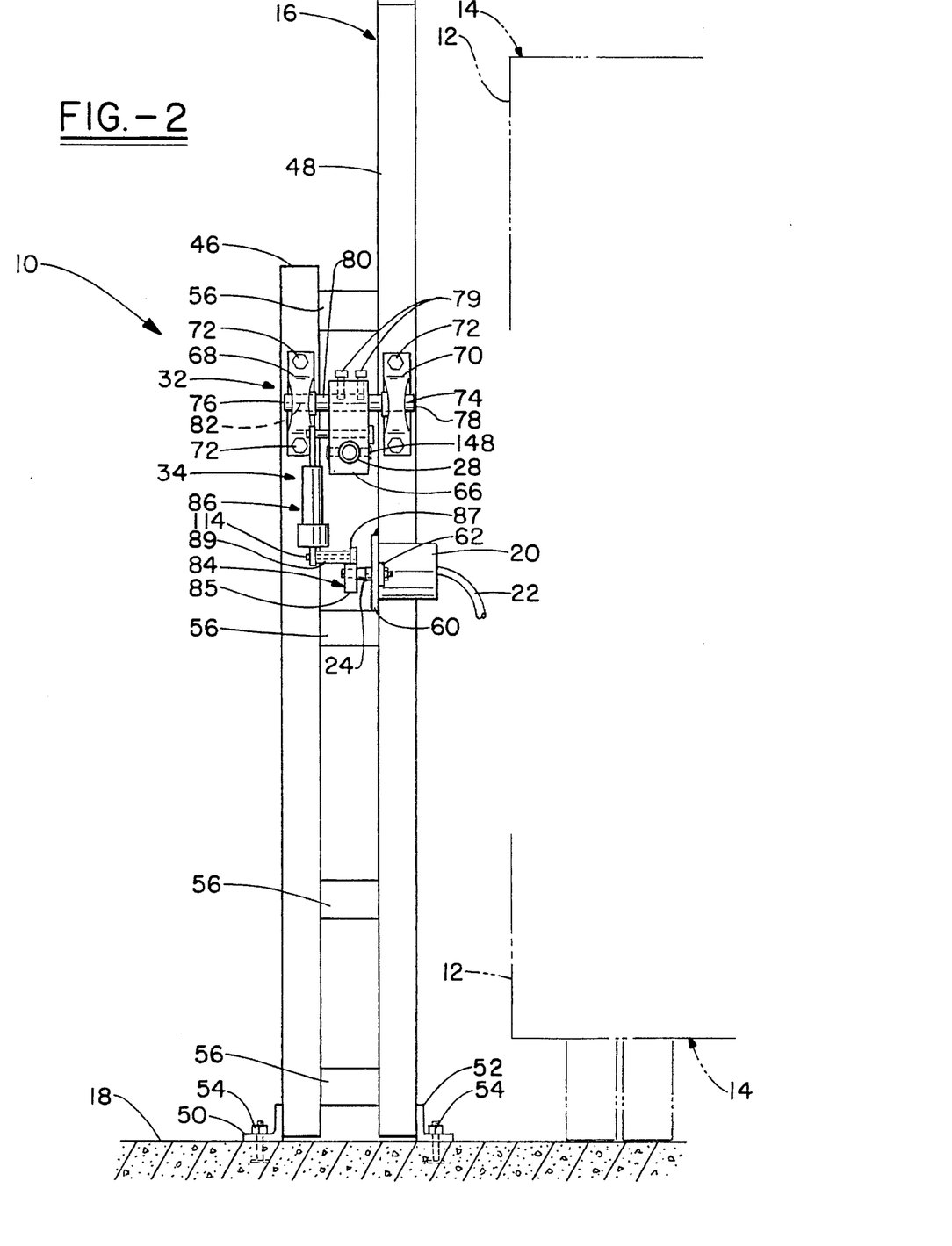
FIG. 2 is an elevational view taken along line 2—2 in FIG. 1.

Support structure 16 includes a pair of substantially vertically extending stanchions 46 and 48, which are laterally spaced from one another. Stanchions 46 and 48 are attached to base members 50 and 52, respectively, by conventional means such as welding. Base members 50 and 52 may comprise standard angle iron members as shown in FIG. 2 or alternatively, may comprise other shapes. Base members 50 and 52 are each secured to the support surface 18 of the wash facility by conventional means such as bolts 54. Support structure 16 further includes cross members 56 which extend between and interconnect stanchions 46 and 48 for purposes of structural rigidity. Cross members 56 are preferably square box beams, such as 2"×2" box beams, having a first end welded to stanchion 46 and an opposing end welded to stanchion 48. Alternatively, cross members 56 may comprise other structural support members having comparable structural rigidity and may be attached to stanchions 46 and 48 by other conventional means. Structure 16 further includes a mount bracket 60 which is fixedly attached to stanchion 48 by conventional means such as welding. Motor 20 includes a housing 62 which is fixedly attached to mount bracket 60 by conventional means such as fasteners 64.

Spray bar 28, which has a generally cylindrical shape in a preferred embodiment, is inserted in and passes through a hole formed in a pivot block 66 which is pivotally mounted to support structure 16. Spray bar 28 is attached to pivot block 66 via a plurality of set screws (not shown) so as to prevent relative movement between spray bar 28 and pivot block 66, and therefore pivots with block 66. First and second pillow blocks 68 and 70 are fixedly attached to stanchions 46 and 48, respectively, by conventional means such as fasteners 72 which are hex bolts in a preferred embodiment. A hinge pin 74 has opposite ends 76 and 78 disposed within and rotatably supported by conventional bearings (not shown) included in pillow blocks 68 and 70, respectively, with the pillow block bearings circumventing ends 76 and 78 of pin 74. A central portion 80 of hinge pin 74 passes through and supports pivot block 66, with portion 80 of pin 74 attached to pivot block 66 via a plurality of set screws 79 so that block 66 is free to pivot about a longitudinal axis 82 of pin 74, as pin 74 rotates about its own axis 82. Due to the attachment of spray bar 28 to pivot block 66, spray bar 28 pivots with block 66.

Figure 5:
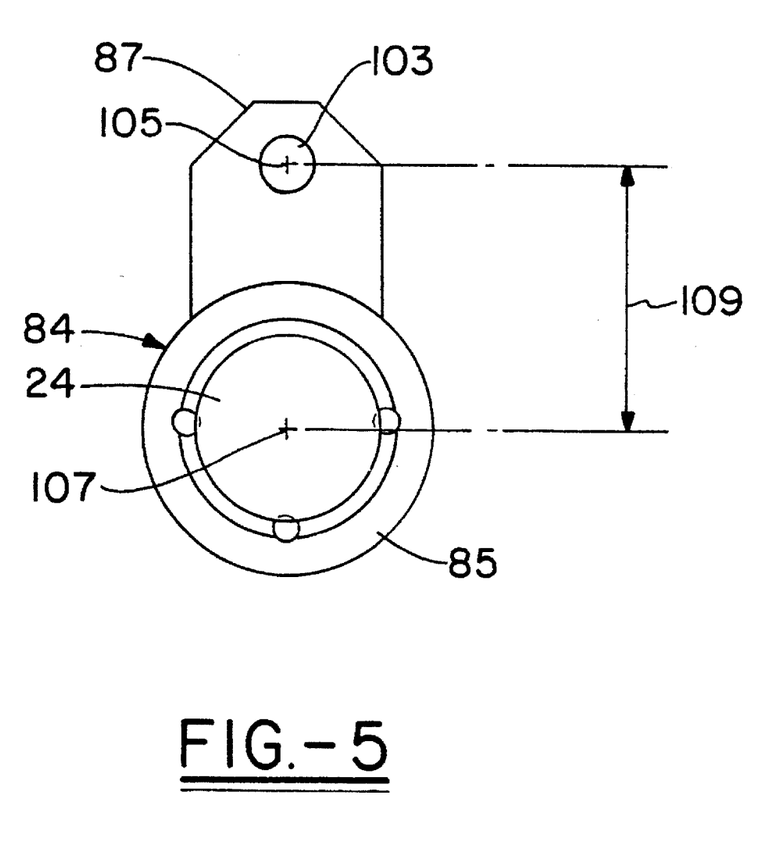
FIG. 5 is an elevational view illustrating the crank arm of the present invention.

Linkage means 34 comprises a crank arm 84 which includes a bushing 85, which is preferably a two-piece taper bushing, keyed to output shaft 24 of motor 20. Crank arm 84 further includes a lever arm 87 which is conventionally attached to the outer periphery of bushing 85, preferably by welding, as best seen in FIG. 5. Linkage means 34 further includes a spring linkage arm 86 which is coupled to shaft 24 via crank arm 84 and is connected to pivot block 66. In a preferred embodiment, a spacer block 89 is positioned between lever arm 87 and the adjacent end of spring linkage arm 86. Linkage arm. 86, block 89 and lever arm 87 are fastened together using conventional fasteners. The structural features and function of spring linkage arm 86 comprise a central feature of the present invention. Spring linkage arm 86 damps the oscillating pivoting motion of spray bar 28, thereby reducing shock loads imparted to pivot block 66 and pillow blocks 68 and 70, at the upstroke and downstroke positions 36 and 38, respectively, of spray bar 28, relative to the shock loads which would be transmitted to pillow blocks 68 and 70 if oscillator 10 utilized a rigid link in place of spring linkage arm 86. Additionally, and most importantly, spring linkage arm 86 reduces the shock loads unparted to the roller bearings (not shown) included in a male rod end 102 and a female rod end 110 of spring linkage arm 86 at the upstroke and downstroke positions 36 and 38, respectively, relative to the shock loads which would be experienced by the rod end roller bearings if spring linkage arm 86 would be replaced by a rigid link. Rod ends 102 and 110 are used to attach spring linkage arm 86 to pivot block 66 and crank arm 84 as subsequently discussed in greater detail. Without spring linkage arm 86, the cyclic shock loading imparted to pivot block 66 could result in a premature failure of the pillow block bearings used to rotatably mount hinge pin 74 as well as the roller bearings included in rod ends 102 and 110.

Figure 3:
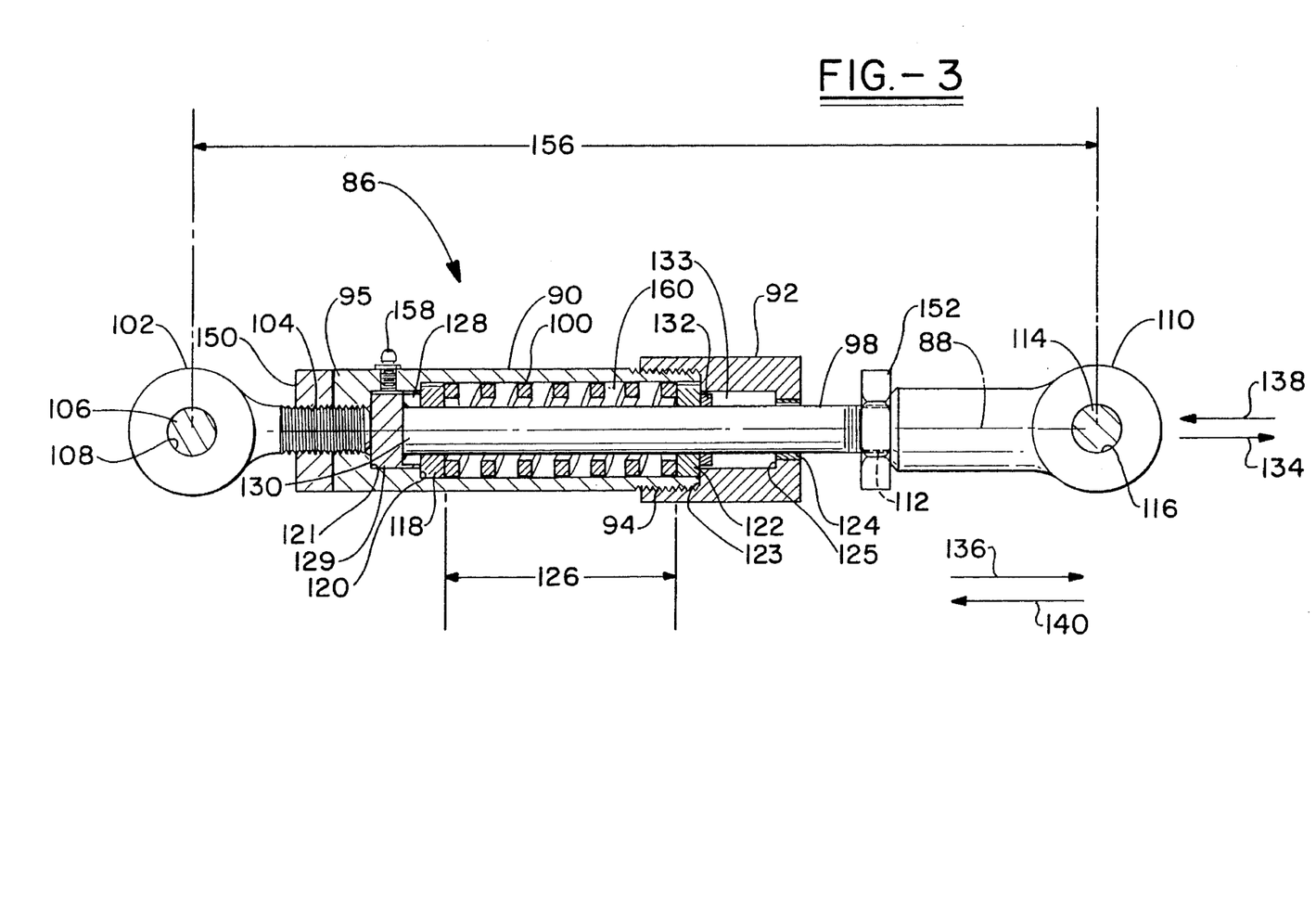
FIG. 3 is an elevational view, partly in longitudinal section, illustrating the spring linkage arm of the present invention.

Referring now to FIG. 3, the specific features of spring linkage arm 86 are discussed in greater detail. Spring linkage arm 86 includes a longitudinal axis 88 and a housing 90 disposed coaxially about axis 88. An end cap 92 surrounds and is threaded onto a first end 94 of housing 90, so as to attach cap 92 to housing 90 coaxially about axis 88. End cap 92 is further secured to housing 90 by applying commercially available locktite to the mating threads of end cap 92 and end 94 of housing 90. A longitudinally extending rod 98 is slideably mounted within housing 90 and end cap 92 so as to permit translation of rod 98 along axis 88. A spring element 100 is disposed within housing 90 in surrounding relationship with rod 98. Spring 100 is preferably made of chrome vanadium for enhanced fatigue life, relative to other commonly used spring materials such as steel. Male rod end 102 includes a shank portion 104 which is threaded into a second end 95 of housing 90. Rod end 102 is preferably attached to pivot block 66, by conventional fasteners such as bolt 106 which passes through hole 108 in rod end 102 and a mating hole in pivot block 66, and a nut (not shown). Alternatively, rod end 102 may be attached to crank arm 84. Female rod end 110 is threaded onto end 112 of rod 98 and is preferably attached to crank arm 84 by conventional fasteners such as bolt 114 and a nut (not shown). Bolt 114 is inserted through hole 116 in rod end 110, a hole in spacer block 89 and a hole 103 (shown in FIG. 5) in lever arm 87 of crank arm 84 and is then secured with a nut. The center 105 of hole 103 in lever arm 87 is displaced from the center 107 of motor output shaft 24 by a distance 109. Accordingly, distance 109, in combination with the allowable translation of rod 98 within housing 90 and end cap 92, determines the magnitude of arc 40 between the upstroke 36 and downstroke 38 positions of spray bar 28. It is noted that if a rigid link were used in place of spring linkage arm 86, the magnitude of arc 40 would be determined solely by the distance 109. Alternatively, rod end 110 may be attached to pivot block 66. Spring linkage arm 86 further includes first and second bushings 118 and 122, respectively, disposed within housing 90. When spring linkage arm 86 is in a no-load condition, bushing 118 is disposed in abutting relationship with shoulder 120 formed in housing 90 and bushing 122 is disposed in abutting relationship with end cap 92. A third bushing 124 is disposed in end cap 92. Rod 98 slidingly engages and is supported by bushings 118, 122 and 124 which are longitudinally spaced from one another, with rod 98 passing though central holes formed in each bushing. Spring element 100 extends longitudinally between bushings 118 and 122 and preferably comprises a conventional coil spring. Spring linkage arm 86 further includes an annular flange 128 which is fixedly attached to end 130 of rod 98 by conventional means such as welding. An annular stop 132 is releasably attached to rod 98 at a longitudinal position between bushings 122 and 124. Spring element 100 is preloaded in compression which further enhances the fatigue life of spring element 100 by relieving residual surface stresses formed in spring element 100 during manufacture, with the preloading accomplished as follows. Prior to inserting rod 98 into housing 90 and prior to threading end cap 92 onto housing 90, stop 132 is positioned on rod 98 so that a longitudinal distance 126 between bushings 118 and 122 is less than the free state longitudinal length of spring element 100, causing spring element 100 to be compressed or preloaded in compression between bushings 118 and 122. Rod 98 is then inserted into housing 90 with bushing 118 in abutting relationship with shoulder 120 of housing 90. Next, end cap 92 is threaded onto end cap 92 until a shoulder 123 of end cap 92 is in abutting relationship with bushing 122 without displacing bushing 122.

When spring linkage arm 86 is in a no-load, or relaxed position, as illustrated in FIG. 3, flange 128 is disposed within cavity 129 of housing 90 which is defined between shoulder 120 and surface 121, and stop 132 is disposed within cavity 133 which is defined between shoulder 123 and surface 125. Tensile forces, such as force 134 acting on rod end 110 along axis 88 cause rod 98 and flange 128 to translate in direction 136 along axis 88, which in turn forces flange 128 against bushing 118 causing a translation of bushing 118 in direction 136 away from shoulder 120 so as to compress spring element 100 between bushings 118 and 122. In this situation, bushing 122 remains stationary in abutting relationship with end cap 92, so as to react to the loads compressing spring 100. When compressive forces, such as force 138 act on rod end 110 along axis 88, rod 98 translates in an opposite direction 140 along axis 88. Since flange 128 and stop 132 translate with rod 98, flange 128 moves away from bushing 118 and does not exert any load on bushing 118 or spring 100. However, translation of rod 98 forces stop 132 against bushing 122 causing a translation of bushing 122 in direction 140 so as to compress spring element 100 between bushings 118 and 122. Bushing 118 is in abutting relationship with shoulder 120 in this situation which reacts to the forces compressing spring 100. Accordingly, regardless of whether rod end 110 is loaded in tension or compression, due to the connection of spring linkage arm 86 with crank arm 84 and pivot block 66, spring element 100 is always is in compression. The longitudinal lengths of cavities 129 and 133 are sized and spring element 100 is selected, with an appropriate spring constant, so that flange 128 and stop 132 do not bottom out, or contact surfaces 121 and 125, respectively, due to the application of loads 134 and 138 during the operation of wash oscillator 10. It may be appreciated by one skilled in the art that the cyclic fatigue life of spring 100 is significantly increased relative to a spring which is alternately placed in compression and tension or one which cycles between relatively high and relatively low tensile stresses. It may be further appreciated by one skilled in the art that the cyclic fatigue life of spring 100 is greater than a pair of similar, but shorter springs which could be disposed between bearings 118 and 122 if the available space within housing 90 were subdivided by a bulkhead for instance, since the fatigue life of each of the shorter springs would be less than that of spring 100.

Spring linkage arm 86 further includes a jam nut 150 which is threaded onto male rod end 102 in abutting relationship with housing 90 and a second jam nut 152 which is threaded onto end 112 of rod 98 and disposed in abutting relationship with female rod end 110. Accordingly, the position of jam nuts 150 and 152 on rod 98 determine an overall length 156 of spring linkage arm 86 which extends longitudinally between the center of hole 108 in rod end 102 and the center of hole 116 in rod end 110. Arc 40 is established by distance 109 between the center of motor shaft 24 and the center of hole 103 in lever arm 87 and by the sum of the translation or stroke of rod 98 in directions 136 and 140 during operation of oscillator 10. Once arc 40 has been established, the overall length 156 of spring linkage arm 86 may be selected, by adjusting jam nuts 150 and 152, to establish the desired upstroke and downstroke positions 36 and 38, respectively, of spray bar 28.

Spring linkage arm 86 further includes a fitting 158 which is threaded into housing 90 for purposes of packing the interior cavities of housing 90 and end cap 92 with grease. An external source of grease (not shown) may be attached to fitting 158 with grease pumped into cavity 129 between flange 128 and end 95 of housing 90. The grease may then be pumped through at least one longitudinal passage extending through flange 128 or alternatively and preferably through the annular clearance between flange 128 and housing 90 and then through at least one longitudinal passage in bushing 118 into cavity 160 so as to protect spring element 100 from water-induced corrosion. The grease may then be pumped through at least one longitudinal passage in bushing 122, through the annular clearance between stop 132 and end cap 92 and into cavity 133 within end cap 92. Finally, the grease may be forced to the exterior of end cap 92, preferably through the annular clearance between the inside diameter of bushing 124 and rod 98, or alternatively through at least one passage formed through bushing 124, thereby providing visual evidence that each of the cavities 129, 160 and 133 have been adequately supplied with grease. The combination of the grease contained within cavities 129, 160 and 133 with the preferred orientation of spring linkage arm 86 having rod end 102 fastened to pivot block 66 and rod end 110 fastened to crank arm 84, minimizes the water which may leak into the internal cavities of spring linkage arm 86 during operation of wash oscillator 10. A cap (not shown) is placed over fitting 158 during operation of oscillator 10 for the same purpose.

The embodiment of wash oscillator 10 illustrated in FIGS. 1–3 and 5 is particularly suited for washing and rinsing the entire lateral surface of vehicles such as vans or automobiles, passing through the automatic wash facility. It should be understood that oscillator 10 may also be used to wax such vehicles. For this application, the inventor has determined that the portion of the length of spray bar 28 which extends between pivot block 66 and the end of spray bar 28 adjacent spray nozzles 30, which is denoted as distance 142 in FIG. 1, is preferably in a range of 44 to 48 inches, and most preferably is approximately 46 inches. Additionally, predetermined arc 40 is preferably in a range of 78 to 82 degrees and is most preferably approximately 80 degrees. As further shown in FIG. 1, spray bar 28 extends through pivot block 66 and includes an end portion 144 which extends to the left of pivot block 66 and hinge pin axis 82 and beyond support structure 16, with end portion 144 supporting a counterweight 146. Since the magnitude of distance 142 is relatively large, the portion of spray bar 28 to the right of hinge pin axis 82, indicated generally at 150 in FIG. 1 and which includes spray nozzles 30, is relatively heavy and produces a relatively large moment about axis 82 in a clockwise direction as viewed in FIG. 1. Counterweight 146 produces a counterclockwise moment about axis 82 as viewed in FIG. 1 which at least offsets, and may balance, the clockwise moment produced by portion 150 of spray bar 28. Accordingly, counterweight 146 may be advantageously used to minimize the torque required to pivot spray bar 28 about axis 82 of hinge pin 74 and therefore permits the use of a reduced size of hydraulic motor 20.

Figure 4:
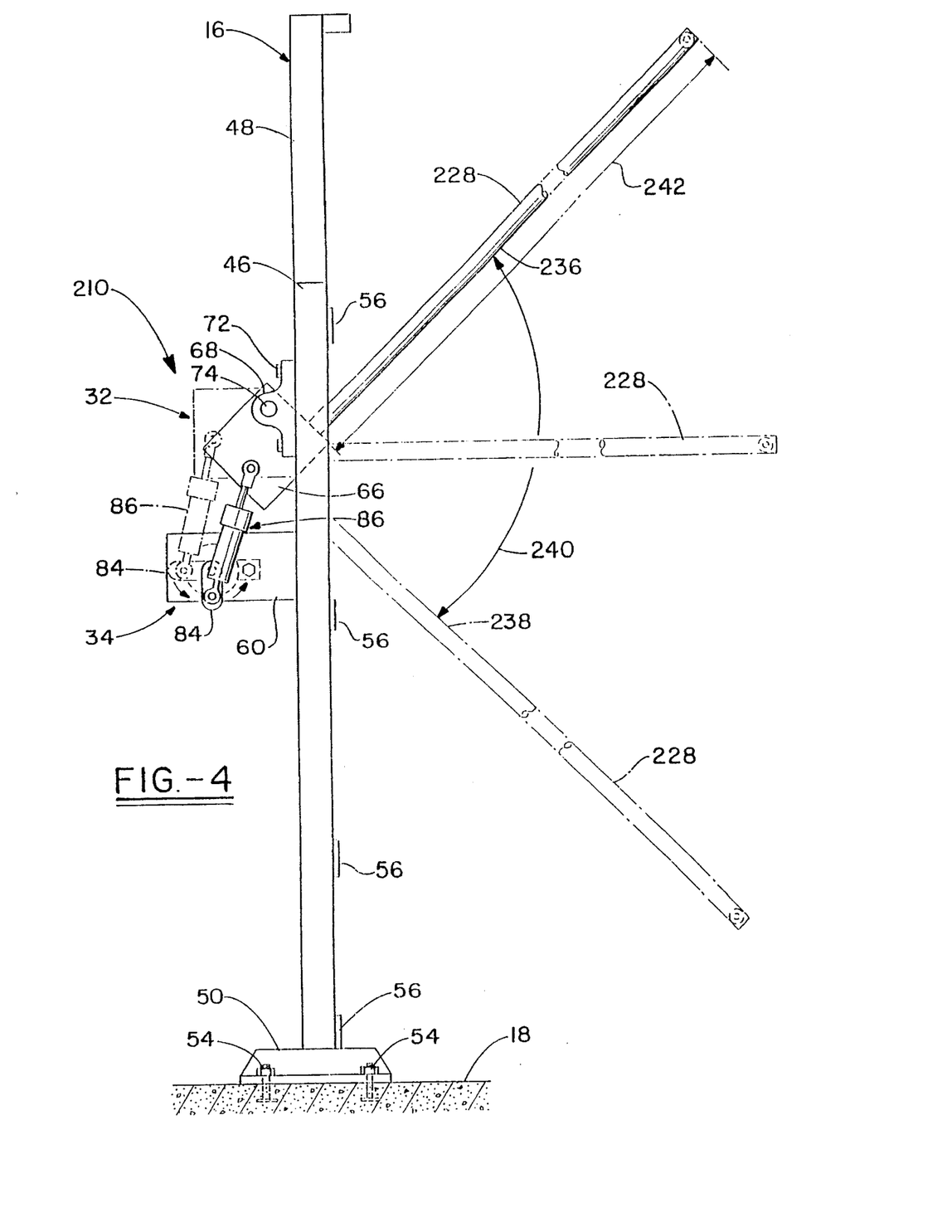
FIG. 4 is an elevational view illustrating the wash oscillator of the present invention according to an alternative embodiment.

FIG. 4 illustrates a wash oscillator 210 according to an alternative embodiment of the present invention, which is particularly well suited for use in cleaning the lower portion of lateral surfaces of vehicles such as vans or automobiles passing through the wash facility. In this embodiment, elements which are common with those of the embodiment of FIGS. 1–3 and 5 are indicated with like reference numerals. In this embodiment, the means for pivotally mounting a spray bar 228 to support structure 16, indicated generally at 32 is positioned on an opposite side of support structure 16 as compared to the positioning of mounting means 32 on support structure 16 shown in FIGS. 1 and 2. Similarly bracket 60, which is used to support a hydraulic motor, is positioned on an opposite side of structure 16. Additionally, distance 242, which is the length of spray bar 228 from pivot block 66 to the end of spray bar 228 adjacent spray nozzles 230, is less than the corresponding distance 142 of spray bar 28. Consequently, unlike oscillator 10, oscillator 210 does not include a counterweight attached to spray bar 228, such as counterweight 146 shown in FIG. 1. Unlike spray bar 28, spray bar 228 typically includes only one spray nozzle 230. Distance 109 between the center of shaft 24 and the center of hole 103 in lever arm 87 may be selected in combination with the sizing of cavities 129 and 133 within spring linkage arm 86 to establish the desired predetermined arc 240. Jam nuts 150 and 152 may then be adjusted to provide the required length 156 so as to establish the desired upstroke and downstroke positions 236 and 238, respectively, of spray bar 228. The structural features and functions of wash oscillator 210 are otherwise the same as those of wash oscillator 10 which were discussed previously.

In operation, wash oscillator 10 functions as subsequently described and it should be understood that oscillator 210 functions in a like manner. Further, it should be understood that the wash facility may utilize a pair of either wash oscillators 10 or 210, with one of the oscillators positioned so as to impinge washing and rinsing agents on lateral surface 12 of vehicle 14 and the other oscillator positioned so as to impinge washing and rinsing agents on the opposing lateral surface of vehicle 14. An external source of hydraulic fluid is supplied from the wash facility through flexible hose 22 to hydraulic pump 20, with the hydraulic fluid providing the motive force for driving pump 20 and causing rotation of output shaft 24. Due to the keyed connection between crank arm 84 and shaft 24, as well as the attachment of spring linkage arm 86 with both crank arm 84 and pivot block 66, the rotary motion of output shaft 24 is converted into an oscillating pivoting motion of pivot block 66 and spray bar 28 about the generally horizontally extending axis 82 of hinge pin 74. An external source of water is supplied from the wash facility through a flexible hose (not shown) to spray bar 28 via attachment to a pipe fitting (not shown) having one end threaded into spray bar 28 and disposed within one of a pair of clearance holes 148 formed in opposing sides of pivot block 66. Holes 148 are formed in each side of pivot block 66 so as to accommodate the most convenient location for accepting the water supply, which depends on whether assembly 10 is positioned within the wash facility so as to wash and rinse the left or right hand side of the vehicle 14 passing through the facility. The supplied water then flows into spray bar 28 and along the length of spray bar 28 to spray nozzles 30, via flow passages (not shown). The ends of spray bar 28 are closed so as to prevent water from flowing out either end. The attachment of the hose to pivot block 66 at this location, as well as the attachment of an upstream portion of the hose to structure 16, allows the flexible hose to remain clear of output shaft 24, crank arm 84 and spring linkage arm 86, and minimizes the amount of hose flex required. As spray bar 28 pivots about axis 82, oscillating between upstroke position 36 and downstroke position 38, washing or rinsing agents are sprayed out of nozzles 30 so as to impinge lateral surface 12 of vehicle 14 at substantially right angles with surface 12, thereby providing high impact washing or rinsing action on surface 12.

Due to the connection of crank arm 84, which rotates with output shaft 24, to rod end 102, spring linkage arm 86 is translated in a generally upward or downward direction which is dependent on the relative clock position of crank arm 84. Since rod end 110 is attached to crank arm 84, the motion of crank arm 84 results in either compressive forces being applied to rod end 110, with spray bar 28 being pivoted upward toward upstroke position 36, or tensile forces being applied to rod end 110 with spray bar 28 being pivoted downward toward downstroke position 38. The presence of spring element 100 in spring linkage arm 86, damps the motion of spray bar 28 and reduces the shock loads imparted to mount means 32 at the upstroke position 36 and downstroke position 38 of spray bar 28. Without spring linkage arm 86, i.e. if crank arm 84 and pivot block 66 would be connected by a rigid link, the shock loads imparted to mount means 32 at the upstroke position 36 and downstroke position 38 of spray bar 28 could result in a premature failure of the bearings included in pillow blocks 68 and 70 and those included in rod ends 102 and 110. Accordingly, the presence of spring linkage arm 86 enhances the fatigue life of the pillow block and rod end bearings. Additionally, the fact that spring element 100 is always placed in compression significantly increases the fatigue life of spring element 100 as compared to a spring which is alternately placed in compression and tension or is alternately cycled between high and low tensile values. Wash oscillators 10 and 210 are anticipated to operate so as to pivot spray bars 28 and 228, respectively, between the corresponding upstroke and downstroke positions at a rate which is preferably in a range of 0.5–2.0 cycles per second, and most preferably 0.8–1.6 cycles per second, with oscillator 10 operating at the lower end of the range and oscillator 210 operating at the higher end of the range. With such a relatively high cyclic rate, the importance of the damping effect of spring linkage arm 86, and the continual compressive loading of spring element 100, is amplified.

While the foregoing description has set forth the preferred embodiments of the invention in particular detail, it must be understood that numerous modifications, substitutions and changes can be undertaken without departing from the true spirit and scope of the present invention as defined by the ensuing claims. The invention is therefore not limited to specific preferred embodiments as described, but is only limited as defined by the following claims.

What is claimed is:

1. A wash oscillator for use in providing high impact wash and rinse action on a lateral surface of a vehicle in an automatic wash facility, said wash oscillator comprising:

a support structure positioned on a support surface of the wash facility;

a motor fixedly attached to said support structure, said motor having a rotatable output member;

a spray bar including at least one spray nozzle for providing perpendicular impact of washing and rinsing agents onto the lateral surface;

means for pivotally mounting said spray bar to said support structure; and linkage means connected to said rotatable output member and said pivotal mounting means for converting a rotary motion of said rotatable output member into an oscillating pivoting motion of said spray bar about a substantially horizontally extending axis included in said pivotal mounting means, said spray bar pivoting through a predetermined arc between an upstroke position and a downstroke position of said spray bar, said arc lying in a substantially vertical plane;

wherein said linkage means includes a spring linkage arm coupled to said rotatable output member and connected to said pivotal mounting means; and wherein said spring linkage arm damps said oscillating pivoting motion of said spray bar thereby reducing shock loads imparted to said pivotal mounting means at said upstroke and downstroke positions relative to an otherwise similar wash oscillator using a rigid link in place of said spring linkage arm.

2. The wash oscillator as recited in claim 1, wherein said spring linkage arm comprises:

a longitudinal axis;

a housing disposed coaxially about said axis;

an end cap surrounding and attached to a first end of said housing coaxially about said axis;

a rod slideably mounted within said housing and said end cap so as to permit translation of said rod along said axis;

a spring element disposed within said housing in surrounding relationship with said rod;

means for coupling said housing to one of said rotatable output member and said pivotal mounting means;

means for coupling said rod to the other of said rotatable output member and said pivotal mounting means;

wherein tensile forces acting on said rod coupling means causes said rod to translate in a first direction along said axis thereby placing said spring element in compression;

wherein compressive forces acting on said rod coupling means causes said rod to translate in a second direction along said axis thereby placing said spring element in compression.

3. The wash oscillator as recited in claim 2, wherein said spring linkage arm further comprises:

a first bushing disposed within said housing in abutting relationship with a shoulder formed in said housing;

a second bushing disposed in said housing h abutting relationship with said end cap;

a third bushing disposed in said end cap;

wherein said rod slidingly engages said first, second and third bushings which are longitudinally spaced from one another; and wherein said spring element extends longitudinally between said first and second bushings.

4. The wash oscillator as recited in claim 3, wherein:

said spring linkage arm further includes an annular flange fixedly attached to a first end of said rod and an annular stop releasably attached to said rod;

said flange and said stop are longitudinally spaced from one another.

5. The wash oscillator as recited in claim 4, wherein:

said flange is disposed longitudinally between a second end of said housing and said first bushing;

said stop is disposed longitudinally between said second and third bushings;

translation of said rod in said first direction forces said flange against said first bushing and causes a translation of said first bushing in said first direction away from said shoulder so as to compress said spring element between said first and second bushings;

translation of said rod in said second direction forces said stop against said second bushing and causes a translation of said second bushing in said second direction away from said end cap so as to compress said spring element between said first and second bushings.

6. The wash oscillator as recited in claim 2, wherein:

said rod coupling means comprises a female rod end which is threaded to an end of said rod;

said housing coupling means comprises a male rod end which is threaded to said housing.

7. The wash oscillator as recited in claim 6, wherein said linkage means further comprises:

a crank arm which is connected to said rotatable output member and one of said male rod end and said female rod end.

8. The wash oscillator as recited in claim 7, wherein: said pivotal mounting means comprises a pivot block which is pivotally mounted to said support structure;

said spray bar is attached to said pivot block;

said pivot block is connected to the other of said male rod end and said female rod end.

9. The wash oscillator as recited in claim 8, wherein said mounting pivotal means further comprises:

first and second pillow blocks which are attached to said support structure, said first and second pillow blocks being substantially horizontally aligned with one another and laterally spaced apart on said support structure;

a hinge pin having opposite ends rotatably supported by said first and second pillow blocks and a central portion pivotally supporting said pivot block;

wherein said substantially horizontally extending axis comprises a longitudinal axis of said hinge pin;

wherein said opposite ends of said hinge pin are disposed within said first and second pillow blocks so as to allow said spray bar to pivot about said longitudinal axis of said hinge pin.

10. The wash oscillator as recited in claim 9, wherein said spray nozzles are disposed on said spray bar transverse to a longitudinal axis of said spray bar so as to impinge the washing and rinsing agents onto the lateral surface of the vehicle at substantially right angles relative to the lateral surface.

11. The wash oscillator as recited in claim 6, further comprising: a first jam nut threaded onto said male rod end and disposed in abutting relationship with said housing; and a second jam nut threaded onto said rod and disposed in abutting relationship with said female rod end.

12. The wash oscillator as recited in claim 1, wherein said motor is a hydraulic motor.

13. The wash oscillator as recited in claim 1, wherein said support structure comprises a pair of substantially vertically extending and laterally spaced stanchions and at least one cross member interconnecting said pair of stanchions.

14. The wash oscillator as recited in claim 1, further comprising a counterweight attached to an end of said spray bar which is proximate said mount means, wherein said counterweight minimizes the torque required to pivot said spray bar in said vertical plane.

15. The wash oscillator as recited in claim 1, wherein said spray nozzles are fan-type spray nozzles.

16. A spring linkage arm for use in an apparatus having a rotating member and a pivoting member, said spring linkage arm comprising:

a longitudinal axis;

a housing disposed coaxially about said axis;

an end cap surrounding and attached to a first end of said housing coaxially about said axis;

a rod slideably mounted within said housing and said end cap so as to permit translation of said rod along said axis;

a spring element disposed within said housing in surrounding relationship with said rod;

means for coupling said housing to one of said rotating member and said pivoting member;

means for coupling said rod to the other of said rotating member and said pivoting member;

wherein tensile forces acting on said rod coupling means causes said rod to translate in a first direction along said axis thereby placing said spring element in compression;

wherein compressive forces acting on said rod coupling means causes said rod to translate in a second direction along said axis thereby placing said spring element in compression.

17. The spring linkage arm as recited in claim 16, wherein said spring linkage arm further comprises:

a first bushing disposed within said housing in abutting relationship with a shoulder formed in said housing;

a second bushing disposed in said housing in abutting relationship with said end cap;

a third bushing disposed in said end cap;

wherein said rod slidingly engages said first, second and third bushings which are longitudinally spaced from one another; and wherein said spring element extends longitudinally between said first and second bushings.

18. The spring linkage arm as recited in claim 17, wherein:

said spring linkage arm further includes an annular flange fixedly attached to a first end of said rod and an annular stop releasably attached to said rod;

said flange and said stop are longitudinally spaced from one another.

19. The spring linkage arm as recited in claim 18, wherein:

said flange is disposed longitudinally between second end of said housing and said first bushing;

said stop is disposed longitudinally between said second and third bushings;

translation of said rod in said first direction forces said flange against said first bushing and causes a translation of said first bushing in said first direction away from said shoulder so as to compress said spring element between said first and second bushings;

translation of said rod in said second direction forces said stop against said second bushing and causes a translation of said second bushing in said second direction away from said end cap so as to compress said spring element between said first and second bushings.

20. The spring linkage arm as recited in claim 19, further comprising:

a first jam nut threaded onto said means for coupling said housing and disposed in abutting relationship with said housing, and a second jam nut threaded onto said rod and disposed in abutting relationship with said means for coupling said rod.

* * * * *